United States Patent
Lambertus

(10) Patent No.: US 6,592,147 B2
(45) Date of Patent: *Jul. 15, 2003

(54) FENDER HAVING ELEMENT CONFORMING TO MOUNTING BRACKET

(75) Inventor: James Lambertus, Mesa, AZ (US)

(73) Assignee: U-Haul International, Inc., Phoenix, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/044,084

(22) Filed: Jan. 9, 2002

(65) Prior Publication Data

US 2002/0060451 A1 May 23, 2002

Related U.S. Application Data

(62) Division of application No. 09/437,894, filed on Nov. 9, 1999, now Pat. No. 6,354,625.

(51) Int. Cl.[7] .............................. B62B 9/16; B62D 25/18
(52) U.S. Cl. .................... 280/770; 280/154; 280/854
(58) Field of Search ........................ 280/770, 154, 280/848, 853, 854; 296/198

(56) References Cited

U.S. PATENT DOCUMENTS

| | | | |
|---|---|---|---|
| 1,803,014 A | 4/1931 | Hall ........................ 296/198 |
| 2,460,394 A | 2/1949 | Peatross ................... 280/150 |
| 3,086,794 A * | 4/1963 | Garrett ..................... 280/847 |
| 3,093,392 A | 6/1963 | Barenyi .................... 280/152 |
| 3,584,898 A | 6/1971 | Pearson et al. ........... 280/153 |
| 3,625,545 A * | 12/1971 | Somers et al. ............ 280/170 |
| 3,632,138 A * | 1/1972 | Whiteley, Jr. ............ 280/405.1 |
| 3,879,059 A | 4/1975 | Gibes ....................... 280/153 |
| 4,032,167 A * | 6/1977 | Chereda .................... 410/3 |
| 4,174,850 A | 11/1979 | Hart .......................... 280/153 |
| 4,266,792 A | 5/1981 | Sanders et al. ........... 280/153 |
| 4,268,053 A | 5/1981 | Toppins et al. ........... 280/154 |
| 4,406,474 A | 9/1983 | Scharf ...................... 280/154 |
| 4,447,067 A | 5/1984 | Yamashita ................ 280/153 |
| 4,697,976 A | 10/1987 | Godbersen ................ 414/559 |
| 4,735,427 A | 4/1988 | Fuchs ....................... 280/152 |
| 4,802,685 A * | 2/1989 | Godbersen ................ 114/344 |
| 4,986,571 A * | 1/1991 | Godbersen ................ 280/414.1 |
| 5,074,573 A * | 12/1991 | Dick ......................... 248/289.31 |
| 5,137,414 A * | 8/1992 | Sloan et al. ............... 414/477 |
| 5,139,306 A | 8/1992 | Ott et al. ................... 296/198 |
| 5,238,268 A | 8/1993 | Logan ...................... 280/848 |
| 5,358,302 A | 10/1994 | Schoen et al. ............ 296/187 |
| 5,511,808 A | 4/1996 | Rowland ................... 280/157 |
| 5,613,710 A | 3/1997 | Waner ....................... 280/848 |
| 5,697,644 A | 12/1997 | Logan et al. .............. 280/848 |
| 5,816,616 A | 10/1998 | Boyd ........................ 280/847 |
| 5,829,786 A | 11/1998 | Dahl ......................... 280/848 |
| 5,950,975 A | 9/1999 | Zieske ...................... 248/291 |
| 5,975,548 A | 11/1999 | Galli et al. ................ 280/157 |
| 5,975,549 A * | 11/1999 | Ockenden ................. 280/204 |
| 6,336,677 B2 * | 1/2002 | Scott ......................... 296/198 |
| 6,354,625 B1 * | 3/2002 | Lambertus ................ 280/154 |

* cited by examiner

*Primary Examiner*—Brian L. Johnson
*Assistant Examiner*—Bridget Avery
(74) *Attorney, Agent, or Firm*—Jeffer, Mangels, Butler & Marmaro, LLP

(57) ABSTRACT

A fender includes at least one element extending therefrom that is adapted to engage a mounting bracket affixed to the object to which the fender is to be attached, e.g., a trailer. The element is preferably a curved flange that extends outwardly from an inner bottom edge of the fender.

6 Claims, 4 Drawing Sheets

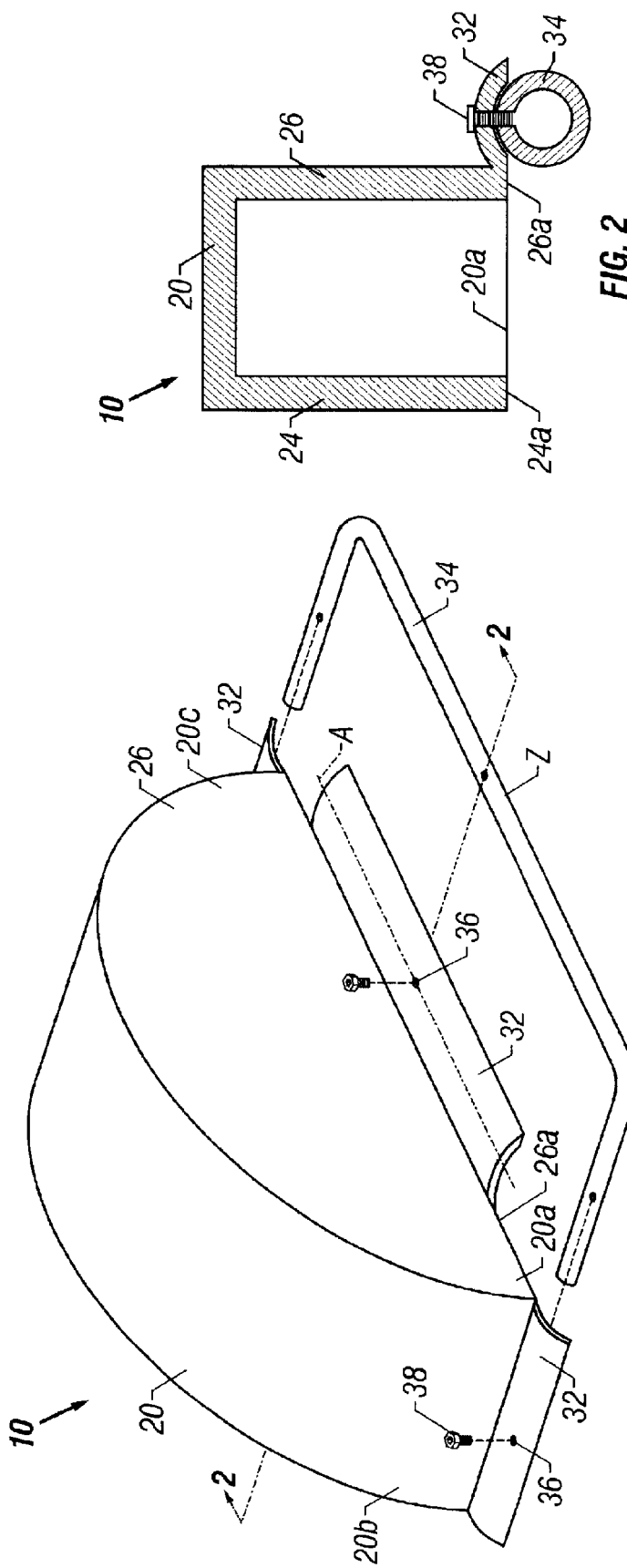

FENDER HAVING ELEMENT CONFORMING TO MOUNTING BRACKET

This is a divisional of application Ser. No. 09/437,894, filed Nov. 9, 1999, now U.S. Pat. No. 6,354,625.

FIELD OF THE INVENTION

The present invention relates to fenders, and more particularly to a fender having an element, such as a flange, that conforms to a mounting bracket.

BACKGROUND OF THE INVENTION

Proper alignment is important when mounting a fender on a trailer. However, aligning a fender in a predetermined position can be difficult due to misregistration of the fender. In the past, those skilled in the art have found it difficult to properly align a fender without a significant amount of effort, therefore wasting time. Furthermore, alignment was often done visually, therefore, allowing for human error.

Due to the substantially horizontal top surface of a conventional fender people tend to step on trailer fenders while getting on and off the trailer. Stepping on the fender places a person's entire body weight on the fender, which can result in damage to the fender if it is not constructed of sufficiently strong materials and designed to withstand such forces. Also, repeatedly stepping on a fender can cause the connection points of the fender to fatigue, which can eventually result in failure at a connection point.

A long felt need exists for a fender that is strong enough to help prevent failure from repeated loading and unloading and that provides easy alignment and simplified mounting.

SUMMARY OF THE PREFERRED EMBODIMENTS

In accordance with one aspect of the present invention there is provided a fender that includes an element extending therefrom that is adapted to engage a mounting bracket affixed to the object to which the fender is to be attached, e.g., a trailer.

More specifically, the element is a flange or hook. The element can extend outwardly from the fender, or can extend inwardly.

In accordance with another aspect of the present invention there is provided a fender assembly including a mounting bracket and a fender as described above.

In accordance with a further aspect of the present invention, there is provided a fender that includes a mounting bracket extending therefrom that is adapted to engage an element extending from a vehicle, such as a trailer.

In accordance with yet another aspect of the present invention there is provided a method of mounting a fender having an element extending therefrom on a mounting bracket. The method includes the steps of securing the mounting bracket to the object to which the fender is to be attached, engaging the element of the fender with the mounting bracket and securing the fender to the mounting bracket.

In accordance with still another aspect of the present invention there is provided a vehicle or trailer having a wheel, and a mounting bracket extending from the vehicle or trailer adjacent to the wheel. The mounting bracket has a fender as described above affixed thereto.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1 is an exploded perspective view of a fender having a plurality of flanges extending therefrom and a tubular mounting bracket, in accordance with a preferred embodiment of the present invention.

FIG. 2 is a sectional rear elevation of the fender of FIG. 1 along line 2—2, showing the fender mounted on the tubular mounting bracket of FIG. 1.

Like numerals refer to like parts throughout the several views of the drawings.

DETAILED DESCRIPTION OF THE PREFERRED EMBODIMENTS

Conventional fender shapes and designs are well known in the art, and the fender shapes illustrated herein are to be considered exemplary and not limiting in any way. As illustrated herein, the fender is provided in combination with a trailer for towing objects, such as automobiles. However, neither the type of trailer nor the object which can be towed thereon is meant to be a limitation on the present invention. The fender can be used on trailers having any number of wheels or axles, for example, a TOW DOLLY$^{SM}$, commercially available from U-Haul International, Inc., which has two wheels rotatably mounted on one axle, or an AUTO TRANSPORT$^{SM}$, commercially available from U-Haul International, Inc., which has four wheels, two each rotatably mounted on each of two axles. The fender can be used on trailers provided for towing automobiles, trucks, boats, motorcycles, personal watercraft, heavy equipment, motor homes, etc. and on flatbed or enclosed general purpose utility trailers.

Figure 3:
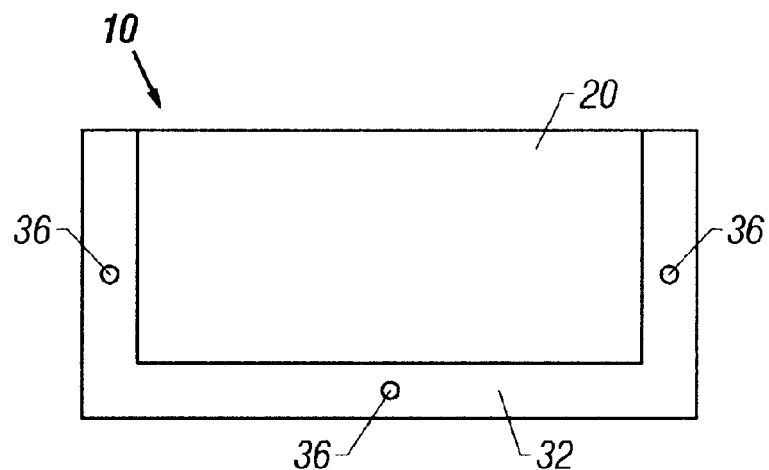
FIG. 3 is a top plan view of a fender having a continuous flange extending from three bottom edges thereof.

Referring to FIGS. 1–3, in a preferred embodiment, the fender 10 is adapted to be mounted on a mounting bracket 34. The shape of the mounting bracket is not a limitation on the present invention. Fender 10 and its components can be shaped to fit the particular mounting bracket in use. For exemplary purposes only, a tubular, u-shaped mounting bracket 34, as shown in FIG. 1, will be described. Others, such as square cross-section or straight mounting brackets, for example, can be employed.

Figure 7:
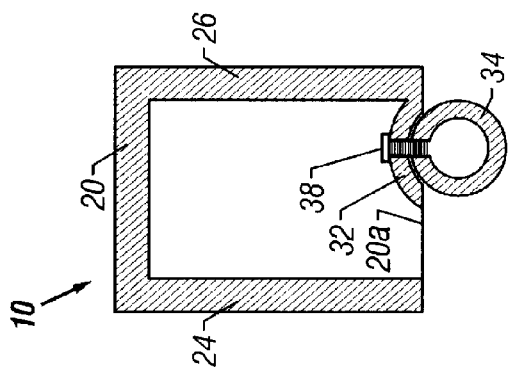
FIG. 7 is a sectional rear elevation of a fender having an inwardly directed element in accordance with an alternative embodiment of the present invention.

Fender 10 includes top portion 20 and opposed outer and inner walls 24 and 26. At least one element extends from fender 10. Preferably the element is a flange 32. Preferably, flange 32 is outwardly directed. However, in an alternative embodiment, flange 32 can be inwardly directed, as shown in FIG. 7. As used herein, the term "outwardly" means directed away from top portion 20, outer wall 24 or inner wall 26, to which it is attached or from which it projects. The top portion 20, outer wall 24 and inner wall 26 each have a bottom edge 20a, 24a and 26a, respectively. Preferably, the flange extends from bottom edge 20a or 26a of top portion 20 or inner wall 26. More than one flange 32 can extend from each of bottom edges 20a, 24a and 26a, or one continuous flange 32 can extend around the entire perimeter (comprising bottom edges 20a, 26a and 24a) of fender 10 or any portion thereof, as shown in FIG. 3.

In a preferred embodiment, flange 32 adapts approximately to the contour of mounting bracket 34. However, it is within the scope of the present invention to employ an element, surface or flange that does not adapt to the contour of mounting bracket 34, but only engages mounting bracket 34. Flange 32 defines a longitudinal axis A as shown in FIG. 1. As shown in FIG. 2, if mounting bracket 34 is tubular, flange 32 has an arcuate cross-section transverse to longitudinal axis A. Flange 32 can include at least one hole 36 for securing fender 10 to the mounting bracket 34 using threaded fasteners 38 or the like. After the mounting bracket is secured to the object to which the fender is to be attached the fender is releasably secured to mounting bracket 34 using threaded fasteners.

The elements of fender 10 (top portion 20, outer wall 24, inner wall 26 and flange 32) preferably are comprised of a rigid material, for example, a metal such as stainless steel or aluminum, a plastic, fiberglass, etc. Also, fender 10 can be formed as one continuous piece, or two or more separate elements can be attached to one another by a conventional attachment method such as welding, fastening with bolts or the like.

Figure 4:
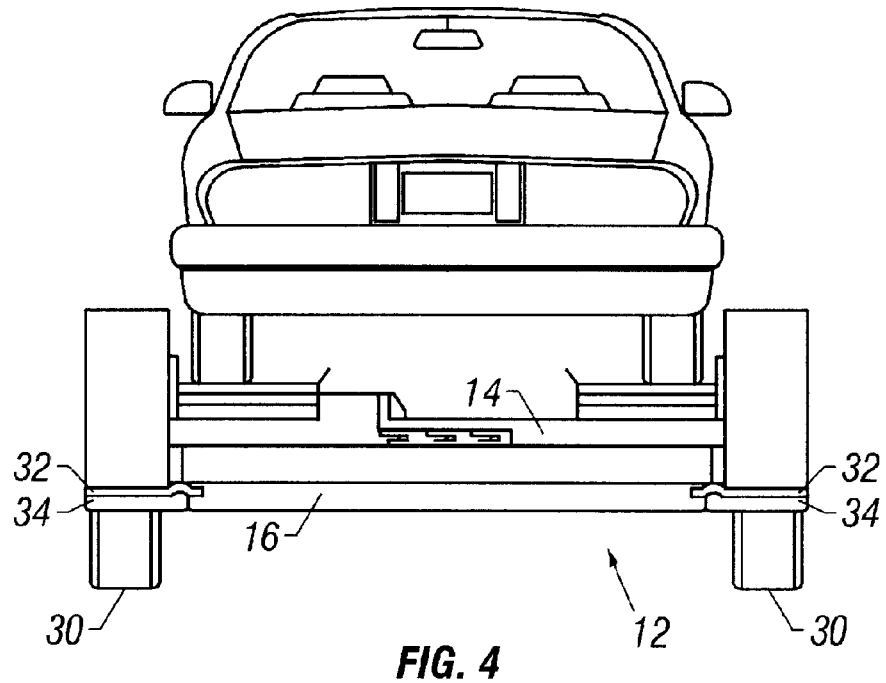
FIG. 4 is a rear view of an auto trailer having two fenders which include an outwardly extending flange in accordance with an alternative embodiment of the present invention.

As shown in FIG. 4, a conventional auto trailer 12 includes a frame 14 having at least one axle 16 with wheels 18 and tires 30 rotatably mounted at opposite ends thereof. Mounting bracket 34 is secured to trailer 12 in a conventional manner, such as by screws, bolts, welding or bonding. Fender 10 is mounted on mounting bracket 34 such that flange 32 is registered or aligned with mounting bracket 34. The conformal shape of the flange(s) 32 enables the operator to determine when fender 10 is in the correct position on mounting bracket 34. The fenders 10 are secured to the mounting brackets 34 and over the tires 30 by slipping threaded fasteners 38 or the like through holes 36 and securing them therein as is conventionally known. Alternatively, fender 10 can be secured to mounting bracket 34 by a conventional method, such as welding, riveting or the like. It should be understood that in a preferred embodiment a right-side fender is a mirror image of a left-side fender. However, this is not a limitation on the present invention.

Figure 5:
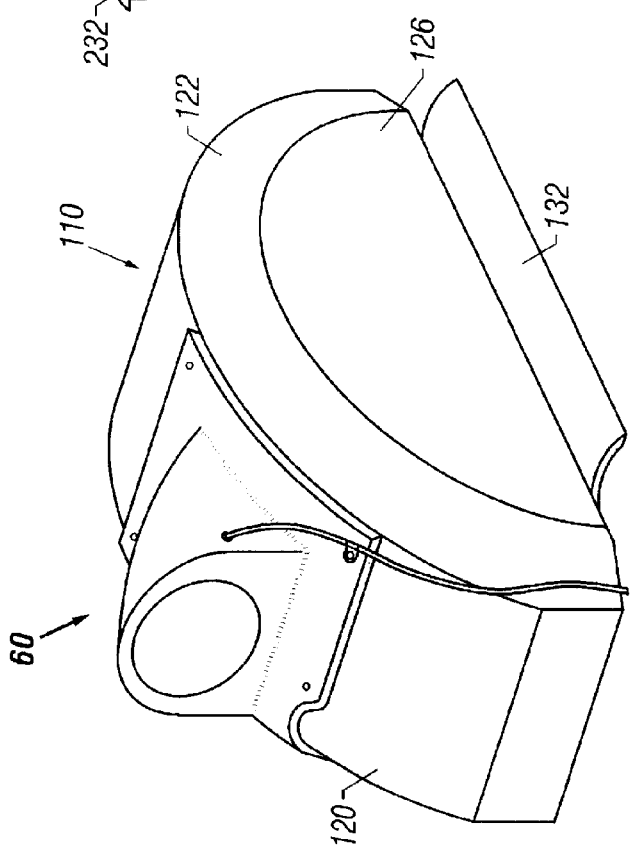
FIG. 5 is a perspective view of a beveled edge fender including an offset light housing secured thereon and an outwardly extending flange in accordance with another embodiment of the present invention.

In an alternative embodiment illustrated in FIG. 5, fender 110 includes a clearance increasing portion 122 between top portion 120 and inner wall 126. The clearance increasing portion 122 allows wider objects, such as a car, to fit onto the trailer than would otherwise be possible without it. Fender 110 includes at least one flange 132 extending from at least one of either inner wall 126 or top portion 120. Fender 110 can also include a light housing 60.

Figure 6:
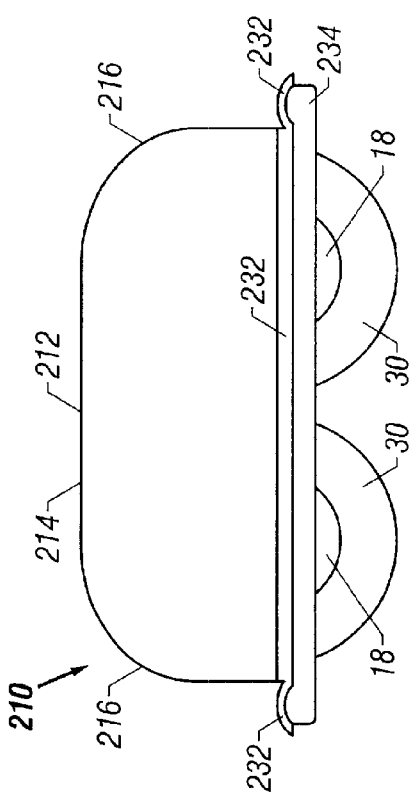
FIG. 6 is a side elevation of an alternative embodiment of a fender according to the invention for accommodating two wheels.

Another alternative embodiment according to the invention is illustrated in FIG. 6. Fender 210 is provided for at least partially surrounding two tires 30. Fender 210 includes a top portion 212 that preferably has a substantially flat middle section 214 and curved end sections 216. Alternatively, top portion 212 can include a flat middle section and flat end sections that connect to the middle section at an angle. Fender 210 can also include a clearance increasing portion as described above. Fender 210 includes at least one flange 232 extending therefrom that is adapted to engage a mounting bracket 234.

Figure 8:
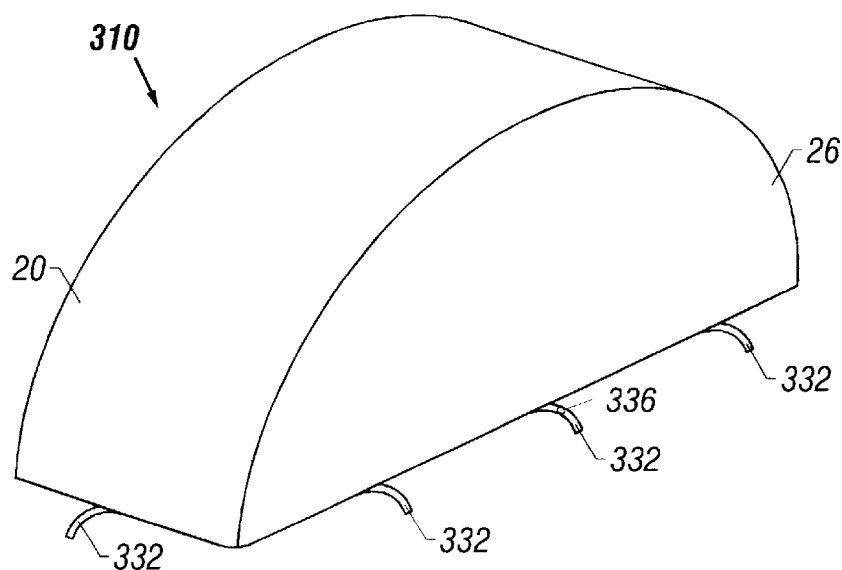
FIG. 8 is a perspective view of a fender having a plurality of hooks extending therefrom in accordance with another embodiment of the present invention.

Another alternative embodiment of a fender 310 according to the present invention is shown in FIG. 8. As illustrated, one or more hooks 332 can be used instead of a flange for engagement with the mounting bracket 34. The hooks 332 can include holes 336 through which a threaded fastener can extend, thereby affixing the fender 310 to the mounting bracket 34. The hooks 332 can extend outwardly, as shown, or inwardly, and can be disposed at various locations on the fender. If desired, a combination of hooks and flanges can be used, for example, with a flange extending along inner wall 26 and hooks at either end of top portion 20.

Figure 9:
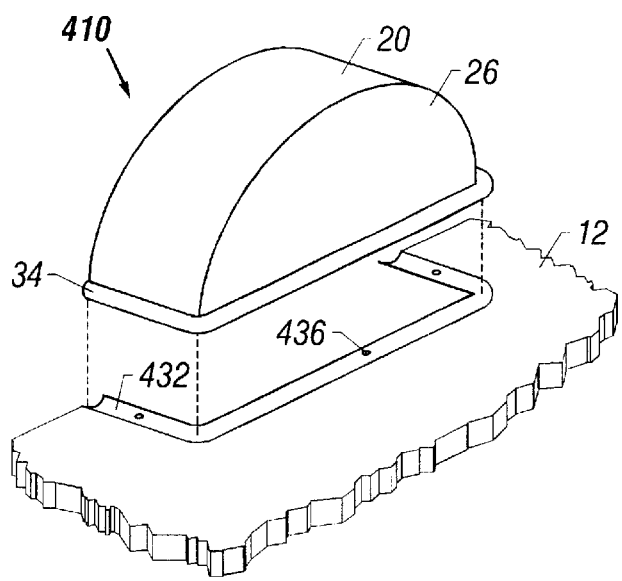
FIG. 9 is an exploded perspective view of a fender having a mounting bracket that is adapted to engage an arcuate element of a fender in accordance with an alternative embodiment of the present invention.

Another alternative embodiment of a fender 410 is illustrated in FIG. 9. As shown, mounting bracket 34 can be affixed to fender 410 and be adapted to engage an element such as an arcuate flange 432 of the trailer 12. Arcuate flange 432 can include holes 436 for affixing fender 410 to trailer 12. A plurality of hooks can replace arcuate flange 432. Mounting bracket 34 can extend outwardly (as shown) or inwardly.

As described above, when mounting a fender on a trailer, alignment can often be difficult. The present invention provides one or more elements affording instantaneous alignment of the fender. This makes the job of installing a fender on a trailer easier and faster. The advantageous placement of the element or elements also strengthens the fender and protects from fatigue failure due to repeated loading and unloading. The amount of surface area of the element or elements that engages the mounting bracket distributes the weight of a person stepping on the top surface of the fender, thereby preventing concentration of forces at a specific point, as is common with trailer fenders.

What is claimed is:

1. A trailer fender comprising:

(a) a top portion, (b) an inner wall extending generally downwardly from said top portion, said inner wall having a bottom edge, and (c) a plurality of hooks extending from said inner wall at a location adjacent said bottom edge of said inner wall, said hooks being adapted to engage a mounting bracket, wherein said top portion has first and second opposite ends, wherein each end of said top portion has a bottom edge, and wherein said bottom edges of said top portion and said bottom edge of said inner wall cooperate to form a continuous edge.

2. A trailer fender for a vehicle, comprising:
(a) a top portion,
(b) an inner wall extending generally downwardly from said top portion, said inner wall having a bottom edge, and
(c) a mounting bracket extending from said inner wall at a location adjacent said bottom edge said inner wall, said mounting bracket being adapted to engage an arcuate flange integrally formed in the vehicle,
wherein said top portion has first and second opposite ends, wherein each end of said top portion has a bottom edge, and wherein said bottom edges of said top portion and said bottom edge of said inner wall cooperate to form a continuous edge.

3. A vehicle and fender assembly, comprising:
a vehicle having a wheel;
a mounting bracket extending from said vehicle adjacent said wheel,
a trailer fender affixed to said mounting bracket comprising:
(a) a top portion,
(b) an inner wall extending generally downwardly from said top portion, said inner wall having a bottom edge, and
(c) a flange extending from said inner wall at a location adjacent said bottom edge of said inner wall, said flange being adapted to engage a mounting bracket, wherein said top portion has first and second opposite ends, wherein each end of said top portion has a bottom edge, and wherein said bottom edges of said top portion and said bottom edge of said inner wall cooperate to form a continuous edge.

4. The vehicle of claim 3 wherein said vehicle is a trailer.

5. A vehicle and fender assembly, comprising:
a vehicle having a wheel;
a flange positioned in said vehicle adjacent said wheel, the flange having an arcuate shape;
a fender having:
(a) a top portion,
(b) an inner wall extending generally downwardly from said top portion, said inner wall having a bottom edge, and
(c) a mounting bracket extending from said inner wall at a location adjacent said bottom edge of said inner wall, said mounting bracket having a shape corresponding to the arcuate shape of the flange and adapted to engage the flange attached to the vehicle,
wherein said top portion has first and second opposite ends, wherein each end of said top portion has a bottom edge, and wherein said bottom edges of said top portion and said bottom edge of said inner wall cooperate to form a continuous edge.

6. A method of mounting a fender having a mounting bracket extending therefrom on a flange, wherein the mounting bracket has an arcuate shape and wherein the flange has a corresponding shape for mating with the mounting bracket, said fender having a top portion with opposite ends each having a bottom edge, an inner wall having a bottom edge substantially perpendicular to said bottom edges of said top portion, said method comprising the steps of:
(a) integrally forming said flange in an object to which said fender is to be attached,
(b) engaging said mounting bracket of said fender with said flange, and
(c) securing said fender to said flange.

* * * * *